(12) United States Patent
Lange et al.

(10) Patent No.: US 7,860,835 B2
(45) Date of Patent: Dec. 28, 2010

(54) DATA OBJECT IDENTIFIERS

(75) Inventors: Stephan J. Lange, St. Leon-Rot (DE);
Gerd G. Forstmann, Nussloch (DE);
Stefan Batzdorf, Schwetzingen (DE)

(73) Assignee: SAP AG, Walldorf (DE)

( * ) Notice: Subject to any disclaimer, the term of this patent is extended or adjusted under 35 U.S.C. 154(b) by 353 days.

(21) Appl. No.: 11/800,926

(22) Filed: May 7, 2007

(65) Prior Publication Data

US 2008/0281855 A1 Nov. 13, 2008

(51) Int. Cl.
*G06F 17/30* (2006.01)

(52) U.S. Cl. .................. 707/638; 707/695; 707/806

(58) Field of Classification Search ............... 707/204, 707/203, 695, 806, 638
See application file for complete search history.

(56) References Cited

U.S. PATENT DOCUMENTS

| 6,236,988 | B1 * | 5/2001 | Aldred | 707/3 |
| 2003/0115223 | A1 * | 6/2003 | Scott et al. | 707/203 |
| 2003/0174710 | A1 * | 9/2003 | Gooch | 370/395.32 |

OTHER PUBLICATIONS

Kemper et al., "Object-Oriented Database Management Applications in Engineering and Computer Science", Prentice-Hall International, pp. 349-375, 459-477 (1994).

Kim, "Introduction to Object-Oriented Databases", The MIT Press, pp. 112-119 (1991).
Bancilhon et al., "Building an Object-Oriented Database System", Morgan Kaufmann, pp. 343-368, 385-410 (1992).
Garcia-Molina et al., "Database System Implementation", Prentice Hall, pp. 144-145, 299-301, 406-408 (2000).
Nittel et al., "A storage server for the efficient support of complex objects", Proceedings of Seventh International Workshop on Persistent Object Systems, May 29, 1996, retrieved from the Internet: URL: <http://citeseer.ist.psu.edu/cache/pape/rs/cs/9319/http:zSzzSzdml.cs.ucla.eduzSz{silviazSzpaperszSzpos7_nittel.pdf/nittel196storage.pdf>, retrieved on Jul. 24, 2008.

* cited by examiner

*Primary Examiner*—John E Breene
*Assistant Examiner*—Thu-Nguyet Le
(74) *Attorney, Agent, or Firm*—Mintz, Levin, Cohn, Ferris, Glovsky and Popeo, P.C.

(57) ABSTRACT

A short identifier can be generated for each of a plurality of data objects. Each short identifier can include a first portion characterizing a sort order and a second portion characterizing a composite component identifier associated with the corresponding data object. The sort order can characterize a relationship (e.g., grouping, etc.) among at least a subset of the plurality of data objects. After the short identifiers have been generated, they can be stored in a database to enable queries of the database containing a short identifier to return data contained within the corresponding data objects. Related systems, apparatus, methods, and/or articles are also described.

13 Claims, 3 Drawing Sheets

DATA OBJECT IDENTIFIERS

TECHNICAL FIELD

The subject matter described herein relates to identifiers of data objects.

BACKGROUND

In computer science, an object can be characterized as an individual unit of run-time data storage that can be used as the basic building block of programs. Objects are often identified by identifiers that can consist of multiple components. Such identifiers are referred to as composite identifiers and because such composite identifiers refer to multiple components, such identifiers, in the aggregate, can consume significant amounts of database storage. In addition, if objects with large composite identifiers are frequently referenced, then the total memory consumption of the corresponding composite identifiers can hamper system performance.

Some conventional techniques have adopted hash value based short identifiers to reduce the memory consumption. However, hash values have the characteristic of being evenly dispersed in the related value range. Thus, a grouping of objects that is given by one or more components of the composite identifier cannot be preserved. Assuming that the processing of objects is often group related, reading a group of objects in a database means reading in the complete value range of the hash values, which makes page based caching techniques at the database inefficient.

SUMMARY

In one aspect, a short identifier can be generated for each of a plurality of data objects. Each short identifier can comprise a first portion characterizing a sort order and a second portion characterizing a composite component identifier associated with the corresponding data object. The sort order can characterize a relationship among at least a subset of the plurality of data objects. After the short identifiers are generated, they can be stored in a database to enable queries of the database containing a short identifier to return data contained within the corresponding data objects.

The first portion may comprise sort criteria, hashes of sort criteria, or portions therefore. The sort order can be arranged so that adjacent objects are adjacent in the sort order. Adjacent may be established through a counter when the objects are created, and or the objects may be assigned to groups. In addition, the sort order may, in some implementations be generated from two or more of the plurality of components characterized by the composite component identifier being mapped to bytes of the first portion of the short identifier in order ranging from most significant to least significant sort criterion. In other implementations, the sort order may be generated from two or more of the plurality of components characterized by the composite component identifier being mapped to bytes of the first portion of the short identifier according to a hierarchy of the components.

The second portion can comprise, for example, a hash of at least a portion of the composite component identifier, or alternatively, at least a portion of the composite component identifier (which may be a concatenation of the various components within the corresponding data object).

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
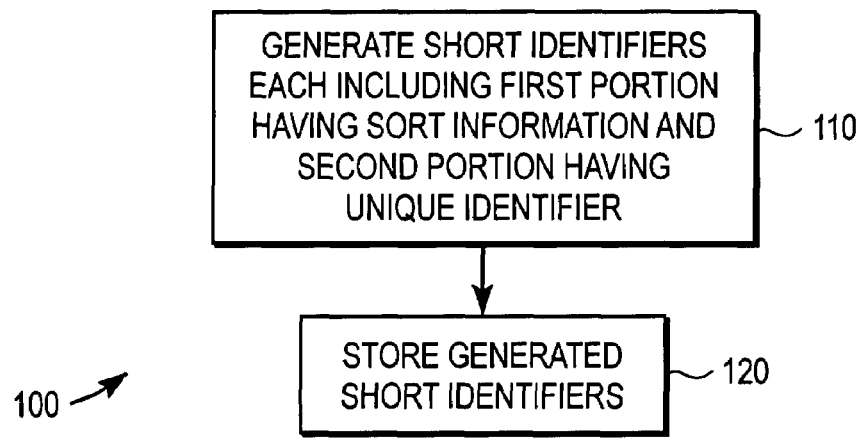
FIG. 1 is a process flow diagram illustrating a method for generating short identifiers.

FIG. 1 is a process flow diagram illustrating a method 100 in which, at 110, a short identifier is generated for each of a plurality of data objects. Each short identifier comprises a first portion characterizing a sort order and a second portion characterizing a composite component identifier associated with the corresponding data object. The sort order can characterize a relationship among at least a subset of the plurality of data objects. Once the short identifiers are generated, at 120, the short identifiers are stored in a database to enable queries of the database containing a short identifier to return data contained within the corresponding data objects.

Several business applications require IDs which combine several characteristics of the ID techniques described above. The ID technique described below produces IDs which are short, globally unique and have reasonable sort criterion. It is assumed that the objects also have a composite component ID representation.

The ID of an object can consist of multiple components. Often, every component has its own semantic meaning. An example is a car ID consisting of three components: country, state and state-local car number. Composite IDs can be considerably large depending on the number of components and the size of each component. Composite IDs can be unique provided that their characterizing components are also unique.

Every component of the composite ID can be considered a sort criterion. Assuming a composite semantic ID consists of n components. Then the first component can be considered the first sort criterion. The second component represents a more specific sort criterion and so forth, the n-th criterion being the most specific. Regarding the car example this means that the IDs of all cars from the USA are stored adjacent.

Every state forms its own group within the cars from the USA which means that the IDs of all cars from California are stored adjacent as well.

Every object can be assigned a number generated by a computer-local counter. With such an arrangement, objects that are assigned an ID one after the other have adjacent IDs. However, such computer-local counter IDs are not globally unique, but rather, they are only local to the environment in which it was created. In some variations, the counter is taken from the system clock assuming a very precise clock so that every ID assignment takes place at a different system time. A counter ID can be relatively small. 8 Bytes can already distinguish more than $1.8*10^{19}$ objects.

Objects can have a defined sort order depending on the order or point of time of ID assignment.

With a hash-based short ID (which typically has a smaller size than composite IDs), it can be assumed that there is a composite ID that globally identifies an object. From the concatenated ID components, a secure hash value can be calculated. Based on limitations to definition, hash values cannot guarantee that two different composite IDs do have not the same hash value. On the other hand secure hash algorithms make duplicates unlikely by using a sophisticated hash algorithm and sufficient hash length size. However, hash values are evenly dispersed in the value range so that a grouping of objects which is given by one or more components of the composite identifier cannot be preserved.

Global unique identifiers (GUIDs) which combine randomly generated numbers, computer/network node specific information, and time information can be utilized. With GUIDs, a 128 bit value (representing one of several ASCII-representations of different sizes (e.g., 25, 32, 36, characters, etc.)) is generated which is sufficiently random to make collisions with values generated on a distinct machine or identical machine at a different time impossible and/or extremely unlikely. The corresponding values are presumed to be "globally unique".

Several algorithms exist for implementing GUIDs. A prominent one being: ISO/IEC 9834-8:2005 (E)/ITU-T Rec. X.667 (Sep. 2004) (Version 1) and its later versions including Version 4 which uses a different mechanism that ensures that node octets no longer represent the corresponding physical hardware.

A universally unique identifier (UUID) can be represented in binary as 16 octets formed by the concatenation of the unsigned integer fixed length encoding of each of its fields into one or more octets. The number of octets to be used for each field can be:

a) the "TimeLow" field: four octets;
b) the "TimeMid" field: two octets;
c) the "VersionAndTimeHigh" field: two octets;
d) the "VariantAndClockSeqHigh" field: one octet;
e) the "ClockSeqLow" field: one octet;
f) the "Node" field: six octets.

As the Highly varying TimeLow field is the Most Significant bytes, UIDs generated by Version 1 algorithm are typically well ordered, as the examples below demonstrate.

The following sequence of UIDs retrieved from one machine in an interval of 15 minutes demonstrate that the UIDs conform to a static structure with an ordering criteria defined by the time.

62eccd10-af8c-11db-abbd-0800200c9a66
6b83e5d1-af8c-11db-abbd-0800200c9a66
70665b02-af8c-11db-abbd-0800200c9a66
8e833f90-af8c-11db-abbd-0800200c9a66
948814b0-af8c-11db-abbd-0800200c9a66
a28c2f60-af8c-11db-abbd-0800200c9a66

A suitable reordering of the bytes (time-dependent octets at the tail) can yield a good localization.

Suitable "batch-retrieval of UUID-sequences may result in well defined sequences" even in the time domain.

40a46740-af8c-11db-abbd-0800200c9a66
40a46741-af8c-11db-abbd-0800200c9a66
40a46742-af8c-11db-abbd-0800200c9a66
40a46743-af8c-11db-abbd-0800200c9a66
40a46744-af8c-11db-abbd-0800200c9a66

Below a sequence of UUIDs generated by two distinct tools following a Version 4 Algorithm:

5a8967b2-47a0-4c54-b044-b8e4f1c10dea
b4b5bd41-7550-49ae-936d-bd668466c563
aa18a33b-0716-4ea7-95f7-51f38742715e
7ca3fa6a-84df-4144-af34-c99f16265e66
53009bcd-194a-4993-b8a9-668c38a206ba
ff13f364-999e-479a-bb41-81c08df3d973
f0289579-2e4c-42a1-be0c-79885851a18c As is apparent, these UIDs do not follow a localized strategy and appear to be randomly distributed in most of their octets.

A sort-order localized binary short ID can comprise a fixed length byte array that consists of bytes which represent the sort order and bytes that represent the secure hash of the corresponding composite component ID.

Figure 2:
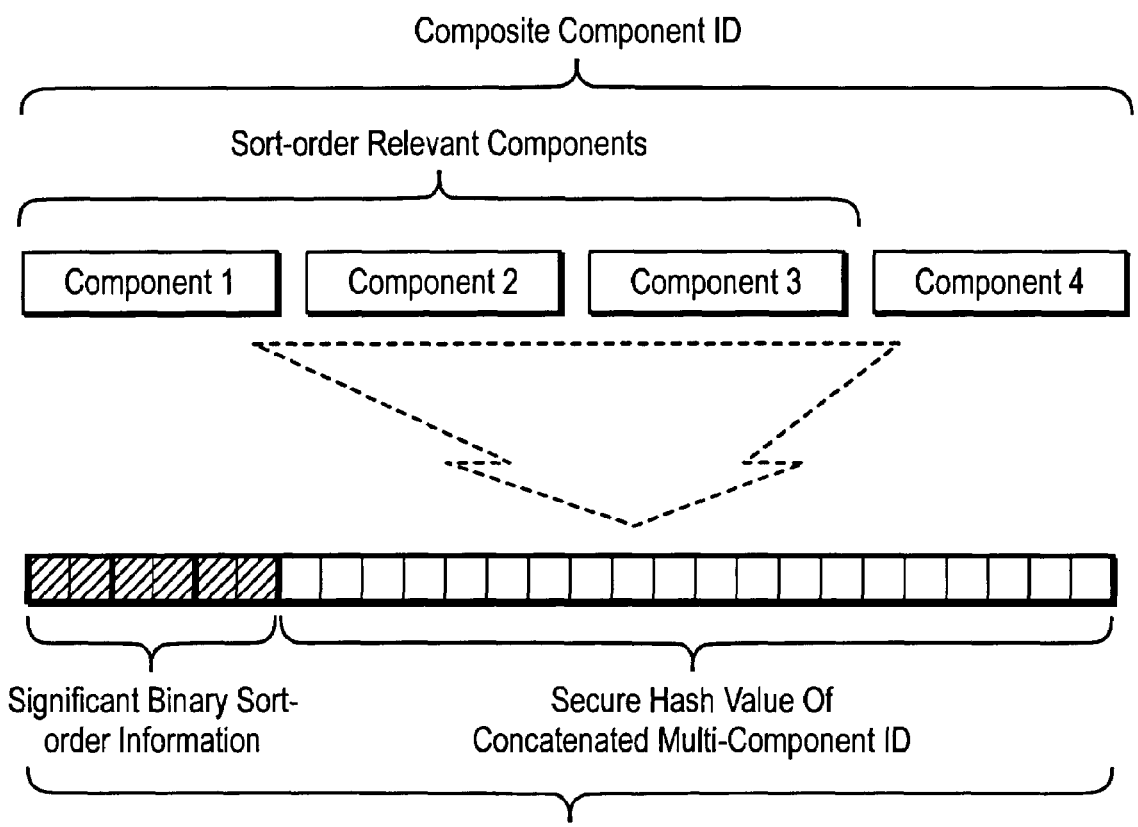
FIG. 2 is a diagram illustrating a short identifier having a first portion with sort-order information and a second portion having a hash value of at least a subset of a concatenated multi-component identifier.

With reference to the diagram 200 of FIG. 2, the sort-order localized binary short IDs are globally unique provided that the corresponding composite ID is globally unique because the concatenated components are mapped to a secure hash. The ID has a fixed length and normally significantly smaller than the composite component ID.

The binary sort order information can ensure that IDs of adjacent objects are also adjacent in the sort order of the ID. Different techniques for the creation of the sort information are possible. The technique should be chosen depending on the characteristics of the corresponding composite component IDs and depending on the application.

The sort-order can be determined by one or more of the components of the composite component ID. Each of the sort-order relevant components can be mapped to one or more bytes of the binary sort-order information. The most significant sort criterion can be mapped to the left byte(s) and the next specific sort criterion can be mapped to the right adjacent bytes and so on.

The mapping of each component to the corresponding sort bytes can be calculated by a hash algorithm. Clashes (i.e., duplicates) are not problematic regarding the globally uniqueness; they only affect the quality of the sort-order. However, only a few sort-order bytes per component make clashes very seldom thus improving the efficiency of database caches significantly.

Figure 3:
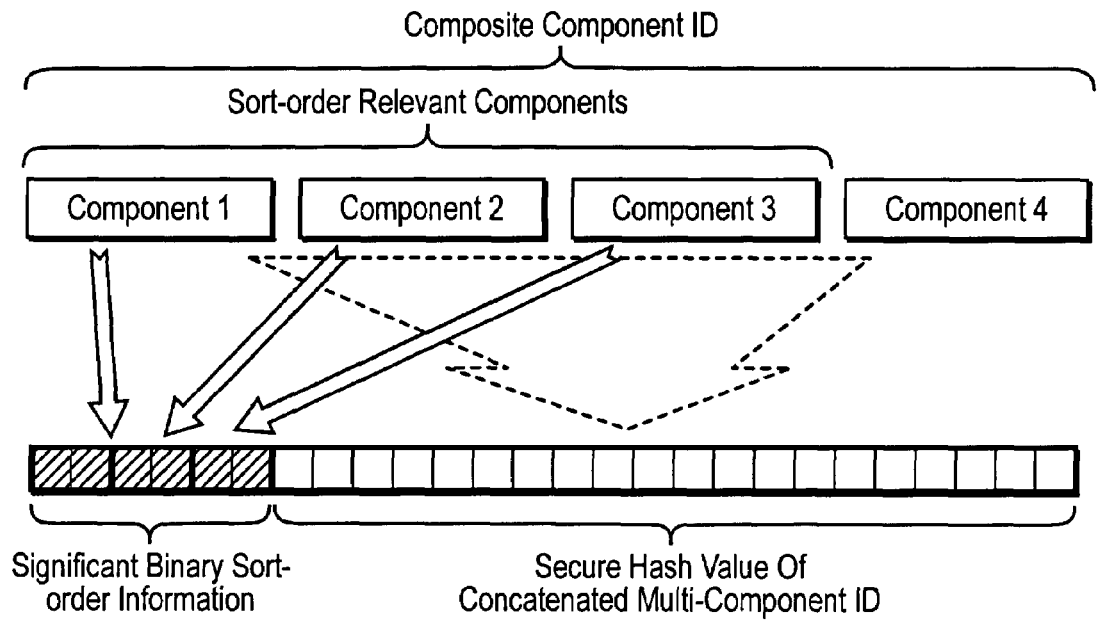
FIG. 3 is a diagram illustrating a short identifier having a first portion with sort-order information generated based on ranked sort criterion and a second portion having a hash value of at least a subset of a concatenated multi-component identifier.
Figure 4:
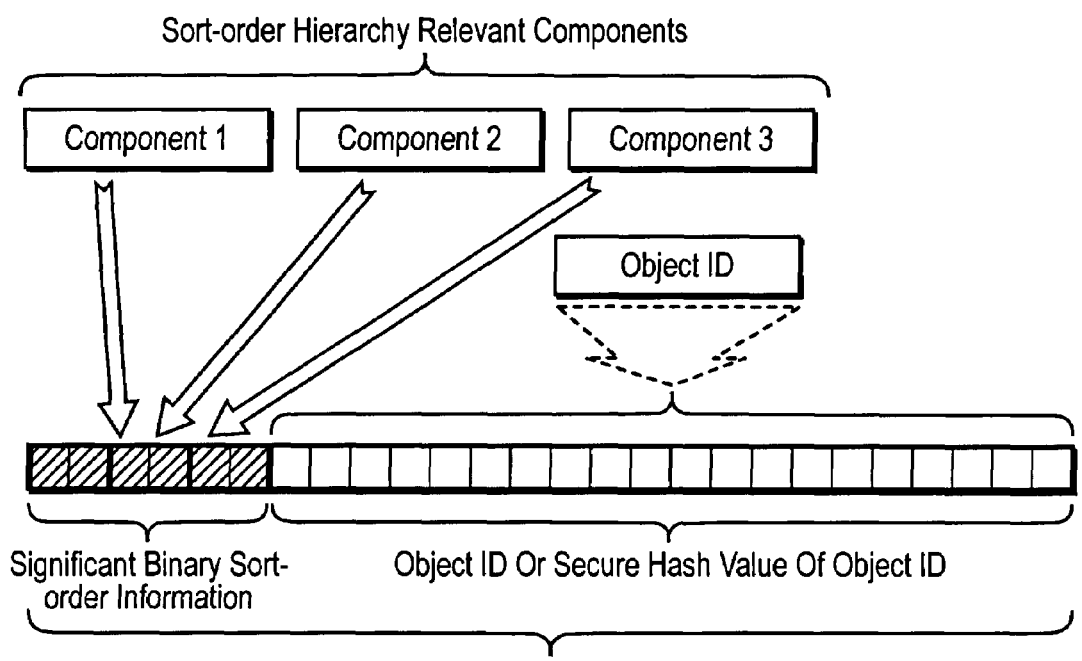
FIG. 4 is a diagram illustrating a short identifier having a first portion with sort-order information generated based on hierarchy information and a second portion having a hash value of at least a subset of a concatenated multi-component identifier.

The diagram 300 of FIG. 3 illustrates the creation of the sort information from three of the four components of a composite component ID. Each of the sort relevant components can be mapped to 2 bytes of the binary sort-order information.

The sort-order can also be determined by other information that sorts the objects reasonable by a criteria which is not part of the component ID. The availability and quality of such information depends on the application. Such a technique can be applicable for combining IDs which (i) do not have sort criterion, (ii) do not have a desired sort criteria (e.g. V4 UUIDs) with sort criteria present in the data (a data hierarchy), or (iii) are part of an auxiliary system (e.g., such as a counter or system clock as described below).

The sort order localized binary short ID can be a fixed length byte array which consists of bytes that represent the sort order and bytes that represent the ID information or the remainder of the ID information. The remainder of the key may be the original unique ID or a hash code thereof (note—the components used to construct the sort hierarchy are not part of the object ID).

Figure 5:
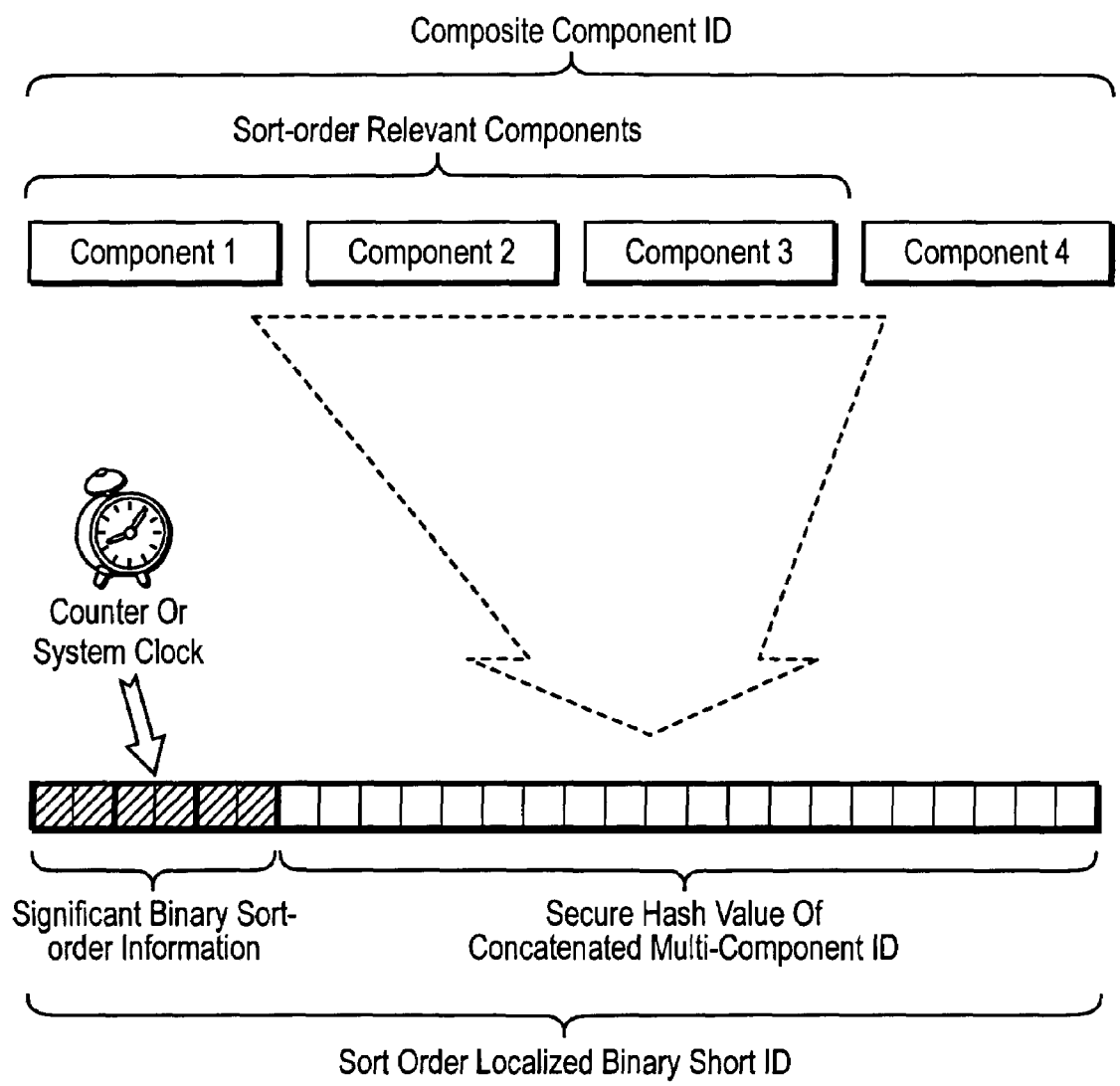
FIG. 5 is a diagram illustrating a short identifier having a first portion with sort-order information generated using a counter or clock and a second portion having a hash value of at least a subset of a concatenated multi-component identifier.

With reference to diagram 500 illustrated in FIG. 5, the binary sort-order information can contain the information of a system counter or system clock. This configuration makes sure that objects which were assigned an ID one after the other have adjacent IDs. However, the system counter or system clock is not globally unique. Notwithstanding, this limitation does not affect the uniqueness of the ID since the ID contains also the secure hash of the corresponding composite component ID.

With localization via concatenation of significant byte order information and remainder ID, the sort criteria may be:
1. Part of the data ID (e.g. a sorted component ID);
2. Part of the data, but not associated with the ID (e.g. UUID and additional sort criteria); or
3. Not part of the data, but part of the creation process (system clock or counter).

The significant binary sort-order information can be:
1. the sort criteria;
2. a hash code of the sort criteria;
3. a concatenation of several distinctly defined hash codes from individual segments: (HashCode(C1): HashCode(C2): HashCode(C3);
4. a concatenation of several distinctly defined hash codes from individual segments lengths: HashCode(C1): HashCode(C1:C2): HashCode(C1:C2:C3);
5. A suitable reordered sequence of above strategies to retrieve the desired localization; or
6. Mixtures of the strategies 1,2, 3 and 4 with arbitrary length of the concatenated results and sources of the information. E.g.: Verbatim(C1): HashCode(C2): HashCode(C2:C3): Trunc(C4) . . .

The remainder ID can be:
1. the secure hash value of the complete ID;
2. the full ID (not a hash value thereof, e.g. a UUID);
3. a hash value constructed from a subset of the ID (if the concatenation with the significant Binary Sort Order part is sufficient to guarantee uniqueness); or
4. A subset of the ID value, if uniqueness is guaranteed with the combination of the binary sort order.

Reconstruction of the original component key may or may not be possible from the short ID. The short ID may or may not be calculable in a determined manner from the object data alone. As an example, the system counter/time is not calculable from the object information alone.

The key construction may also involve a desired reordering of the bytes of the original key to achieve the desired localization without adding further information (e.g. Version 1 UUIDs may be reordered in the binary key to yield the desired localization).

Given the original pattern for VI Algorithm UUIDs:
a) the "TimeLow" field: four octets; [TL]
b) the "TimeMid" field: two octets; [TM]
c) the "VersionAndTimeHigh" field: two octets; [VT]
d) the "VariantAndClockSeqHigh" field: one octet;
e) the "ClockSeqLow" field: one octet; [VC] both d) and e)
f) the "Node" field: six octets. [NODE]

Three UUIDs generated on the same node may be (in original representation):
[TL_____]-[TM]-[VT]-[VC]-[NODE_____]
62eccd10-af8c-11db-abbd-0800200c9a66
6b83e5d1-af8c-11db-abbd-0800200c9a66
70665b02-af8c-11db-abbd-0800200c9a66

The following reordering could be applied if node ordering, then time ordering shall be a significant sort criterion:
[NODE_____]-[TM]-[TL_____]-[VT]-[VC]
0800200c9a66-af8c-62eccd10-11db-abbd
0800200c9a66-af8c-6b83e5d1-11db-abbd
0800200c9a66-af8c-70665b02-11db-abbd The following reordering could be applied if only time ordering shall be a significant sort criterion:
[TM]-[TL_____]-[VT]-[VC]-[NODE_____]
af8c-62eccd10-11db-abbd-0800200c9a66
af8c-6b83e5d1-11db-abbd-0800200c9a66
af8c-70665b02-11 db-abbd-0800200c9a66

The such constructed keys can:
a) have identical size to the original ones;
b) contain the full information; or
c) be localized according to a desired criteria.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable storage medium" refers to any device (e.g., magnetic discs, optical disks, memory, Programmable Logic Devices (PLDs)) used to store machine instructions and/or data to a programmable processor. A machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein provides many advantages. In one example, for applications that store data in a relational database, using short IDs in database tables reduces disk space consumption. Smaller memory consumption per object increases the number of objects that can be cached by the database which affects both table caches and table index caches. The sort order of the sort order localized binary short IDs can increase the efficiency of the database cache regarding database selects. The paging algorithm of the database cache can work well with applications that often read or modify objects in groups that correspond to the sort order localization. Moreover, the global uniqueness of the sort order localized binary short identifiers allows load-based data migration from one database to another database without the need of converting the object identifiers.

In a second example, for applications that work on computer clusters, the use of short IDs reduce the memory consumption of the applications in comparison to the use of composite component identifiers. This arrangement increases cache efficiency because more objects can be simultaneously be held in the caches. The reasonable sort order makes paging algorithms efficient. The global uniqueness of the identifier allows cluster notifications (from one computer to other computers in the cluster in case of modifications) using the sort order localized binary short identifiers. Such cluster notifications reduces the amount of sent data compared to composite component identifiers.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed is:

1. An article comprising a tangibly-embodied machine-readable storage medium operable to cause one or more machines to result in operations comprising:

generating a short identifier for each of a plurality of data objects, each short identifier comprising a first portion generated based on hierarchy information and characterizing a sort order which depends on the time assigning identifier and a second portion characterizing a composite component identifier associated with the corresponding data object, the sort order characterizing a relationship among at least a subset of the plurality of data objects, the short identifier being globally unique and consisting of a unitary alphanumeric string, the first portion being separate from and different than the second portion; and storing the generated short identifiers in a database to enable queries of the database containing a short identifier to return data contained within the corresponding data objects;

wherein the first portion comprises a first hash of at least a portion of sort criteria;

wherein the second portion comprises a second hash of at least a portion of the composite component identifier;

wherein the composite component identifiers are globally unique identifiers that combine randomly generated numbers, computer network specific information, and time information.

2. An article as in claim 1, wherein the sort order is arranged so that adjacent objects are adjacent in the sort order.

3. An article as in claim 1, wherein the short identifier is a fixed length byte array.

4. An article as in claim 1, wherein the composite component identifier characterizes a plurality of components within the corresponding data object.

5. An article as in claim 4, wherein two or more of the plurality of components characterized by the composite component identifier are mapped to bytes of the first portion of the short identifier in order ranging from most significant to least significant sort criterion.

6. An article as in claim 4, wherein two or more of the plurality of components characterized by the composite component identifier are mapped to bytes of the first portion of the short identifier according to a hierarchy of the components, the hierarchy being based on components that are not included in the composite component identifier.

7. An article as in claim 1, wherein each of the data objects include a counter designation, and wherein the sort order is arranged so that data objects having adjacent counter designations are adjacent in the sort order.

8. An article as in claim 1, wherein the first portion comprises a concatenation of hashes for each of at least two components defined by the corresponding data object.

9. A computer-implemented method for implementation by one or more data processors comprising:

generating, by at least one data processor, a short identifier for each of a plurality of data objects, each short identifier comprising a first portion generated based on hierarchy information and characterizing a sort order which depends on the time assigning identifier and a second portion characterizing a composite component identifier associated with the corresponding data object, the sort order characterizing a relationship among at least a subset of the plurality of data objects, the short identifier being globally unique and consisting of a unitary alphanumeric string, the first portion being separate from and different than the second portion; and storing, by at least one data processor, the generated short identifiers in a database to enable queries of the database containing a short identifier to return data contained within the corresponding data objects;

wherein the first portion comprises a first hash of at least a portion of sort criteria;

wherein the second portion comprises a second hash of at least a portion of the composite component identifier;

wherein the composite component identifiers are globally unique identifiers that combine randomly generated numbers, computer network specific information, and time information.

10. A method as in claim 9, wherein the sort order is arranged so that adjacent objects are adjacent in the sort order.

11. A method as in claim 9, further comprising mapping, by at least one data processor, two or more components characterized by the composite component identifier to bytes of the first portion of the short identifier in order ranging from most significant to least significant sort criterion.

12. A method as in claim 9, further comprising mapping, by at least one data processor, two or more of the plurality of components characterized by the composite component identifier to bytes of the first portion of the short identifier according to a hierarchy of the components.

13. An article comprising a tangibly-embodied machine-readable storage medium operable to cause one or more machines to result in operations comprising:

generating a short identifier for each of a plurality of data objects, each short identifier comprising a first portion generated based on hierarchy information and that identifies a grouping for each object, and a second portion including a hash of a composite component identifier associated with the corresponding data object, the sort order depending on the time assigning identifier and characterizing a relationship among at least a subset of the plurality of data objects, wherein the first portion is separate from and different than the second portion; and storing the generated short identifiers in a database according to the corresponding groupings to enable queries of the database containing a short identifier to return data contained within the corresponding data objects;

wherein the composite component identifier comprises a plurality of concatenated components, the concatenated components selected from components within the corresponding data object, two or more of the concatenated components being mapped to bytes of the first portion of the short identifier in order ranging from most significant to least significant sort criterion at two or more sort levels;

wherein the first portion consists of a concatenation of several distinctly defined hash codes from individual segment lengths of the composite component, wherein at least two of the defined hash codes are based on common segments of the composite component;

wherein the composite component identifiers are globally unique identifiers that combine randomly generated numbers, computer network specific information, and time information.

* * * * *